United States Patent [19]
Spatafora

[11] Patent Number: 5,937,999
[45] Date of Patent: Aug. 17, 1999

[54] CONVEYOR

[75] Inventor: Mario Spatafora, Bologna, Italy

[73] Assignee: Azionaria Costruzioni Macchine Automatiche A.C.M.A. S.p.A., Bologna, Italy

[21] Appl. No.: 09/033,090

[22] Filed: Mar. 2, 1998

[30] Foreign Application Priority Data

Mar. 3, 1997 [IT] Italy .................................. BO97A0117

[51] Int. Cl.$^6$ .................................................. B65G 19/26
[52] U.S. Cl. ........................................... 198/728; 198/732
[58] Field of Search ..................... 198/728, 732

[56] References Cited

U.S. PATENT DOCUMENTS

| 2,443,010 | 6/1948 | Petskeyes . |
| 3,876,062 | 4/1975 | Honda . |
| 4,890,724 | 1/1990 | Loewenthal ............................ 198/732 |

FOREIGN PATENT DOCUMENTS

| 0 291 449 | 11/1988 | European Pat. Off. . |
| 0 729 905 | 9/1996 | European Pat. Off. . |

*Primary Examiner*—William E. Terrell
*Assistant Examiner*—Mark Deuble
*Attorney, Agent, or Firm*—Larson & Taylor

[57] ABSTRACT

A conveyor for feeding push members along a path having at least one curved portion; each push member having a push appendix hinged to a flexible conveying member of the conveyor by a control device for keeping the appendix parallel to itself as the push member travels along at least part of the curved portion of the path; and the control device having a first lever supporting in rotary manner the appendix and connected to the flexible conveying member in rotary manner at one end and in rotary and axially-sliding manner at the other end; and a second lever, which rotates with respect to the first lever, is hinged to the appendix, and is inclined with respect to the first lever at an angle varying according to the curvature of the path.

13 Claims, 5 Drawing Sheets

CONVEYOR

BACKGROUND OF THE INVENTION

The present invention relates to a conveyor.

In particular, the present invention relates to a chain conveyor featuring a succession of push members, and which may be used to advantage for feeding along a given path confectionary products resting along a table having an opening engaged at least partially by the push members. In the following description, specific reference is made purely by way of example to conveyors of the above type.

In European Patent No. 291,449, confectionary products are conveyed by means of a conveyor comprising a chain looped about two pulleys, and a number of push members, each defined by a lever, one end of which terminates with a push appendix engaging an opening in a table supporting the products. Each lever comprises at least two slots engaged by respective pins parallel to the axes of the pulleys and associated with the chain; and the slots are so formed as to keep the push appendix perpendicular to the table along part of a curved portion of the chain about one of the pulleys.

The appendix is thus disengaged from the opening without tilting with respect to the table, and without cutting or crushing the product in front against the table.

The above known conveyor, however, involves several drawbacks, by virtue of the appendix only being maintained substantially perpendicular to the table along a relatively small portion of said curved portion of the chain; and the length of the curved portion fails to prevent seriously stressing the confectionary products, particularly when using appendixes projecting by a fairly long portion from the table.

SUMMARY OF THE INVENTION

It is an object of the present invention to provide a conveyor designed to overcome the aforementioned drawbacks.

According to the present invention, there is provided a conveyor for feeding push members along a path comprising at least one curved portion; the conveyor comprising a flexible conveying member, and at least one said push member connected to the flexible conveying member to move, together with the flexible conveying member, along said path in a given traveling direction; the push member comprising a push appendix, and a control device interposed between the push appendix and the flexible conveying member to keep the push appendix parallel to itself as the push member travels along at least part of said curved portion of the path; and the control device comprising a first lever supporting the push appendix and having two opposite ends connected, one in rotary and axially-sliding manner and the other only in rotary manner, to the flexible conveying member, so as to rotate, with respect to the flexible conveying member, about a first and a second axis parallel to each other and perpendicular to said path; characterized in that the push appendix is mounted for rotation with respect to the first lever, so as to rotate, with respect to the first lever, about a third axis parallel to said first and second axes; and the control device comprises a second lever, which is mounted for rotation with respect to the first lever, is connected in articulated manner to the push appendix, and is inclined, with respect to the first lever, at an angle varying according to the curvature of the path.

In a preferred embodiment of the above conveyor, said second lever is connected to the first lever so as to rotate, with respect to the first lever, about a fourth axis parallel to the first axis, and is connected to the flexible conveying member to rotate, with respect to the flexible conveying member, about a fifth axis parallel to the fourth axis and located a given distance from the fourth axis.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
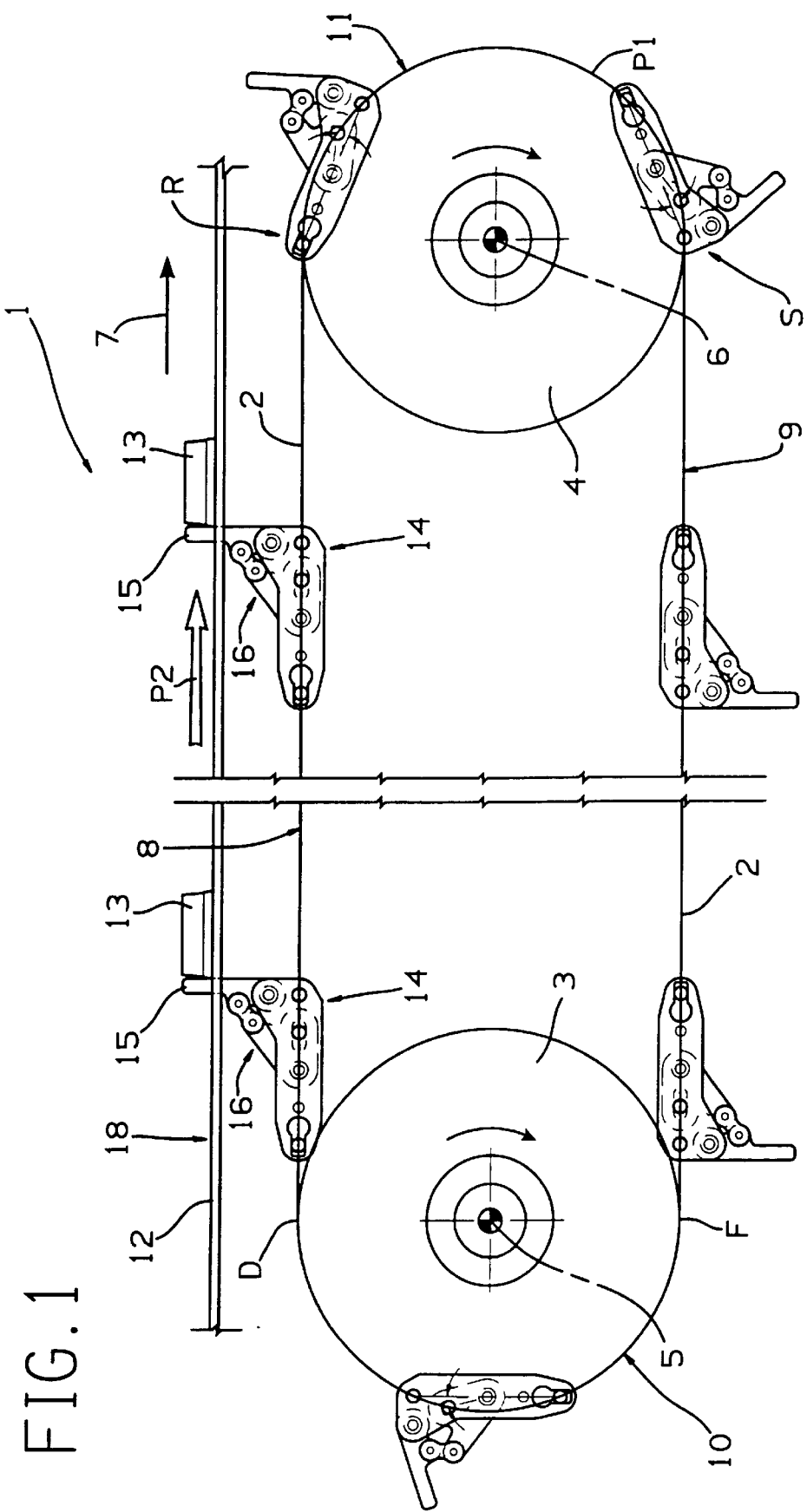
FIG. 1 shows a schematic side view of a preferred embodiment of the conveyor according to the invention.
Figure 2:
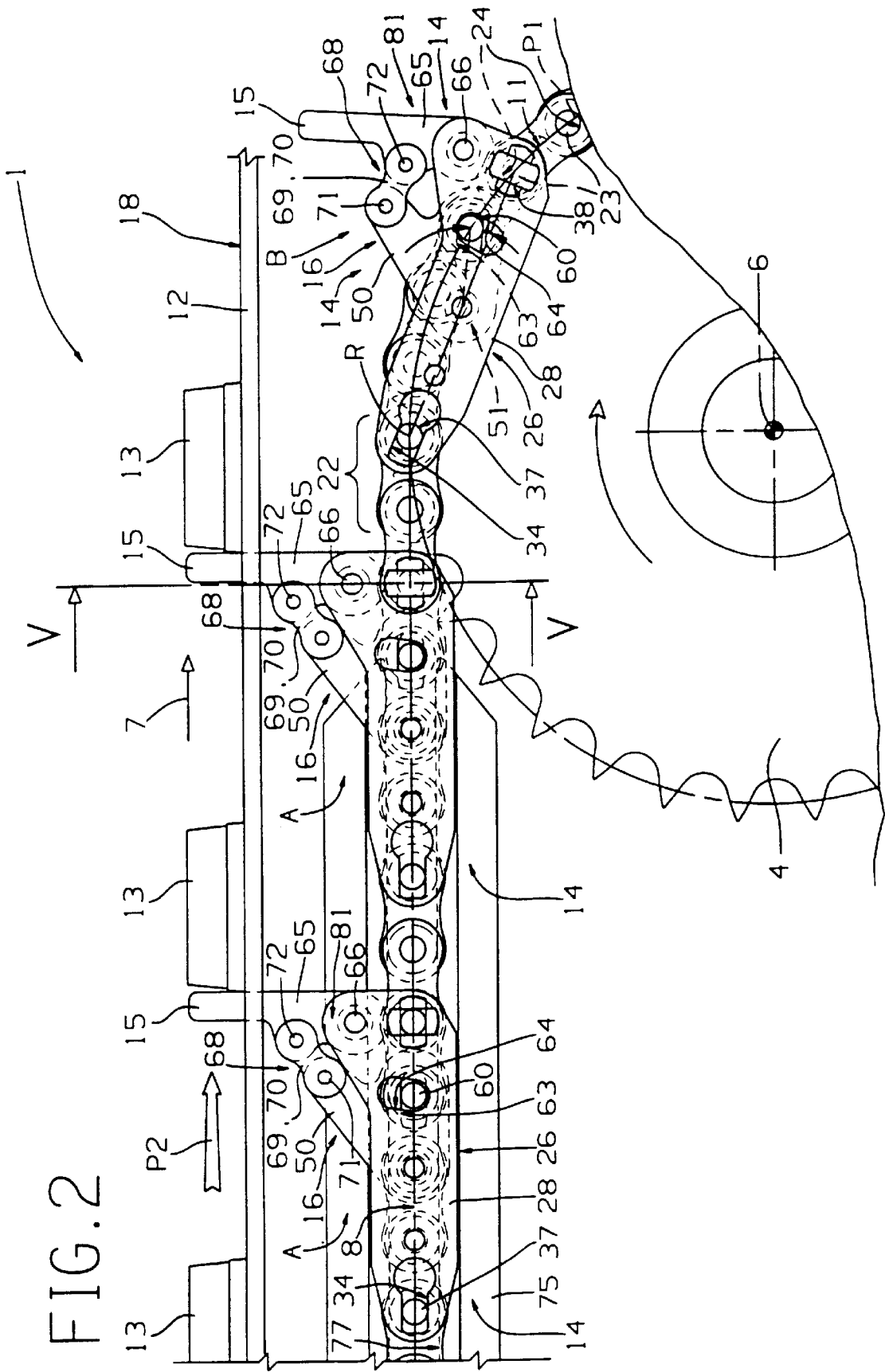
FIG. 2 shows a side view of a detail in FIG. 1.

Number 1 in FIG. 1 indicates a conveyor comprising a flexible conveying member defined by a chain 2 looped about a driven pulley 3 and a drive pulley 4 rotating about respective axes 5 and 6 to feed a straight conveying branch 8 of chain 2 in a direction 7. Chain 2 also comprises a straight return branch 9, a curved return branch 10 connected to branch 8 at a point D and to branch 9 at a point F, and a curved forward branch 11 connected to branch 8 at a point R and to branch 9 at a point S.

Branches 10 and 11 extend about respective pulleys 3 and 4 by an angle of substantially 180°, and define, with straight branches 8 and 9, a path P1 of chain 2.

A table 12 is located over branch 8, and on which is defined a path P2 along which a succession of confectionary products 13 is fed in direction 7.

A number of push members 14 are equally spaced along chain 2, and each comprises a push appendix 15, and a control device 16 for controlling the inclination of appendix 15 with respect to chain 2. Appendix 15 engages an opening 17 in table 12, and projects by a given length above the upper surface 18 of table 12 to feed products 13 along path P2.

Figure 3:
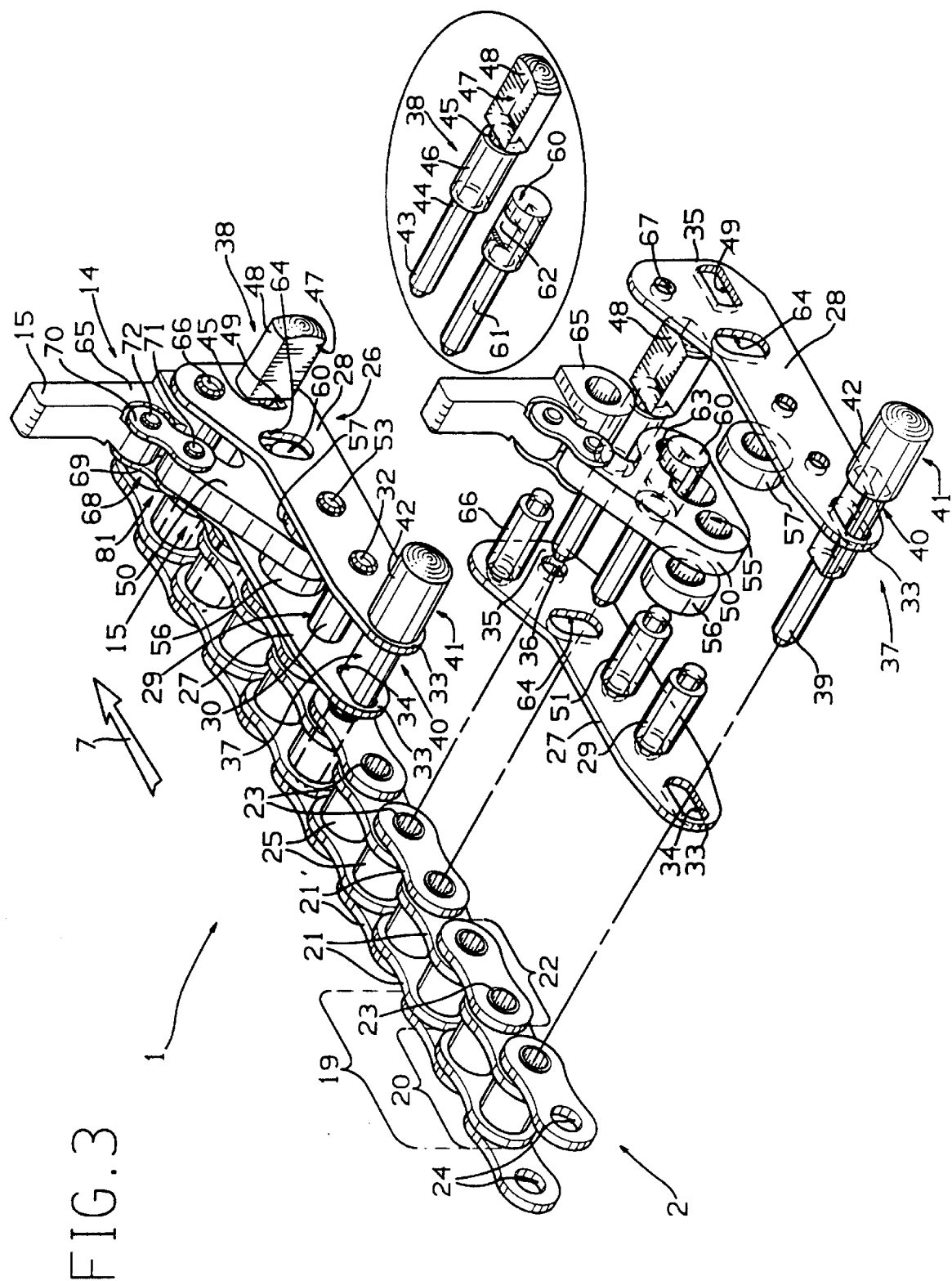
FIG. 3 shows a view in perspective of a detail in FIG. 2.
Figure 4:
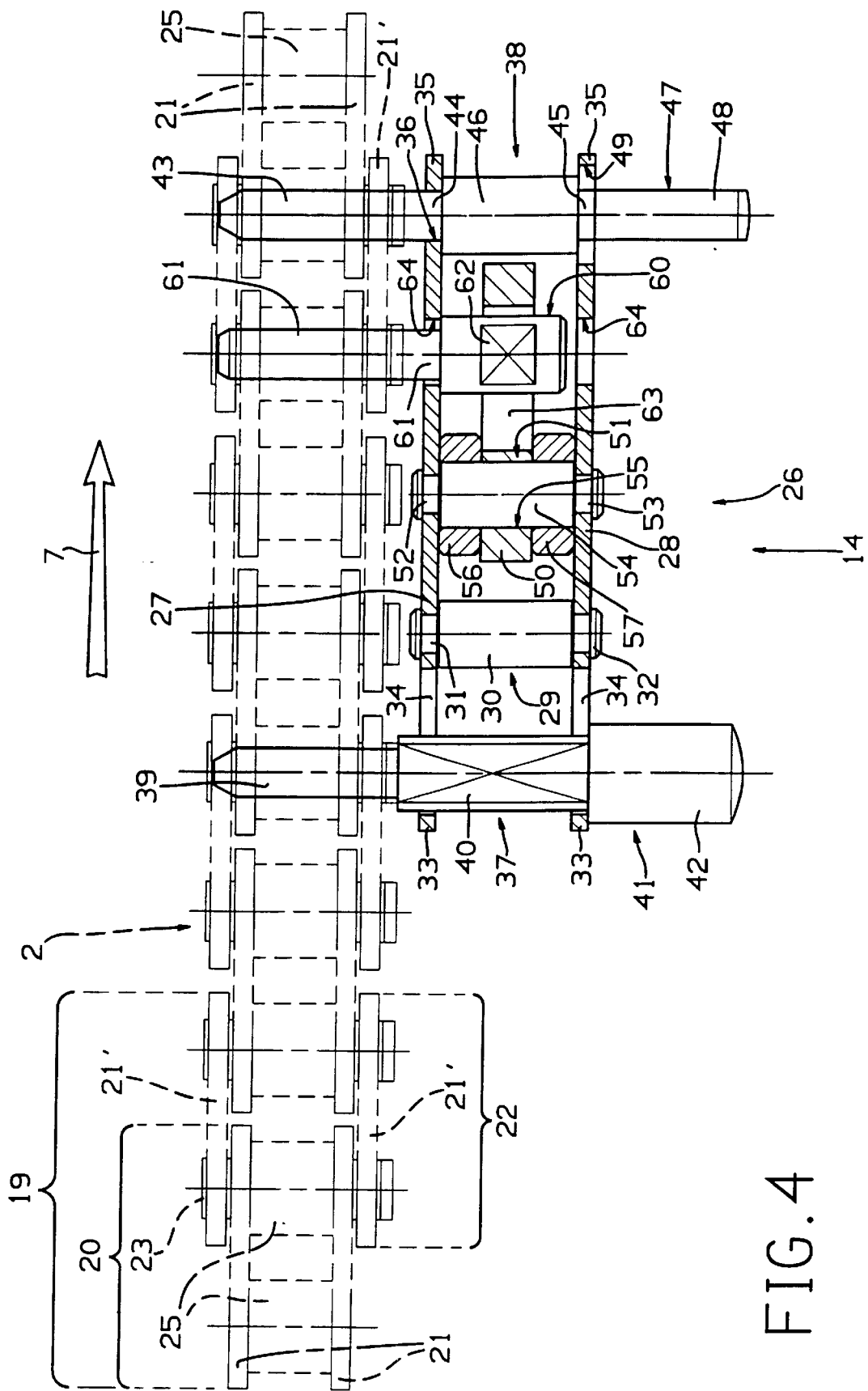
FIG. 4 shows a partially sectioned plan view of the FIG. 3 detail.

With reference to FIGS. 3 and 4, chain 2 comprises a succession of articulated links 19, each of which comprises a first element 20 defined by a pair of facing parallel plates 21, and a second element 22 defined by a pair of facing parallel plates 21' and connected in articulated manner to first element 20 by a hollow pin 23 parallel to axes 5 and 6 and engaging holes 24 in plates 21'. Plates 21 of each element 20 are maintained a given distance from each other by two spacers 25 locked and mounted about pins 23; and plates 21' of each element 22 are maintained a given distance from each by being locked rigidly to the opposite ends of hollow pins 23. Each link 19 is hinged to the adjacent links 19 by pins 23 and spacers 25 in known manner, as described for the articulated connection of elements 20 and 22.

Control device 16 comprises a first lever 26 defined by two facing parallel plates 27 and 28 with identical outer profiles. Plates 27 and 28 are connected to, and maintained a given distance from, each other by a rivet 29, a central portion of which defines a spacer 30 interposed between plates 27 and 28, and the two opposite ends 31 and 32 of which engage respective holes in, and are riveted to, plates 27 and 28.

Each plate 27, 28 is elongated, and extends alongside chain 2 by a length substantially equal to the length of two links 19 of chain 2. A first end portion 33 of plate 27, 28 has a slot 34, the longer dimension of which is substantially parallel to direction 7; and a second end portion 35 of plate 27 has a circular hole 36.

Each lever 26 is fitted to the side of chain 2 by two pins 37 and 38. Pin 37 is fitted to chain 2 by an end portion 39 inserted inside one of pins 23, and comprises a central portion 40 extending through slots 34 in plates 27 and 28 to connect pin 37 in transversely-sliding manner to lever 26; a further end portion 41; and a cylindrical head 42 of a diameter larger than the width of slots 34.

Like pin 37, pin 38 is connected in rotary manner to chain 2 by an end portion 43 inserted inside a corresponding pin 23, and is also connected to plate 27 by a cylindrical portion 44 engaging hole 36 in plate 27, and to plate 28 by a cylindrical portion 45.

Pin 38 also comprises a central portion 46 between and larger in diameter than cylindrical portions 44 and 45, and which acts as a spacer between plates 27 and 28; and a flat head 47 at the opposite end 48 to end portion 43.

Plate 28 differs from plate 27 by comprising, instead of hole 36, a slot 49, which is sized to house cylindrical portion 45 and permit passage of head 47 of pin 38.

Control device 16 also comprises a further lever 50, which is substantially triangular and hinged to lever 26 by a pin 51 having two end portions 52 and 53 engaging respective holes in plates 27 and 28. Pin 51 also comprises a cylindrical central portion 54 larger in diameter than respective end portions 52 and 53; and plates 27, 28 are fitted at opposite ends of portion 54 and secured to pin 51 by riveting the ends of portions 52 and 53.

Lever 50 has a hole 55 formed close to one of its vertices and housing portion 54 of pin 51, and is kept in a given transverse position by a first and second spacer 56 and 57 fitted to portion 54 and interposed between lever 50 and respective plates 27 and 28.

Lever 50 is connected to chain 2 by a pin 60 comprising a first cylindrical portion 61 inserted inside one of pins 23, and a second cylindrical portion 62 larger in diameter than portion 61 and engaging a slot 63 formed in and close to a second vertex of lever 50 and extending substantially in direction 7. Portion 61 of pin 60 fits through a slot 64 formed in a central portion of plate 27 and extending in a direction substantially perpendicular to direction 7. Slot 64 in plate 27 is aligned with a corresponding slot 64 formed in plate 28.

Control device 16 comprises a further lever 65 hinged to lever 26 by a spacer pin 66 crosswise to path P1 and parallel to pins 23, 37, 38, 51 and 60. Pin 66 comprises an intermediate portion for spacing plates 27 and 28, and which fits through one end of lever 65; and two end portions, which project from lever 65 and plates 27, 28 through respective holes 67 formed substantially above hole 36 and slot 49. Pin 66 is riveted to plates 27 and 28 to lock one with respect to the other; and, at the opposite end to that carrying pin 66, lever 65 comprises an end portion defining push appendix 15.

Lever 65 is hinged to lever 50 by a lever 68, which comprises two sheet metal plates 69 and 70 hinged to opposite sides of levers 50 and 65 by two pins 71 and 72 parallel to pin 66.

Figure 5:
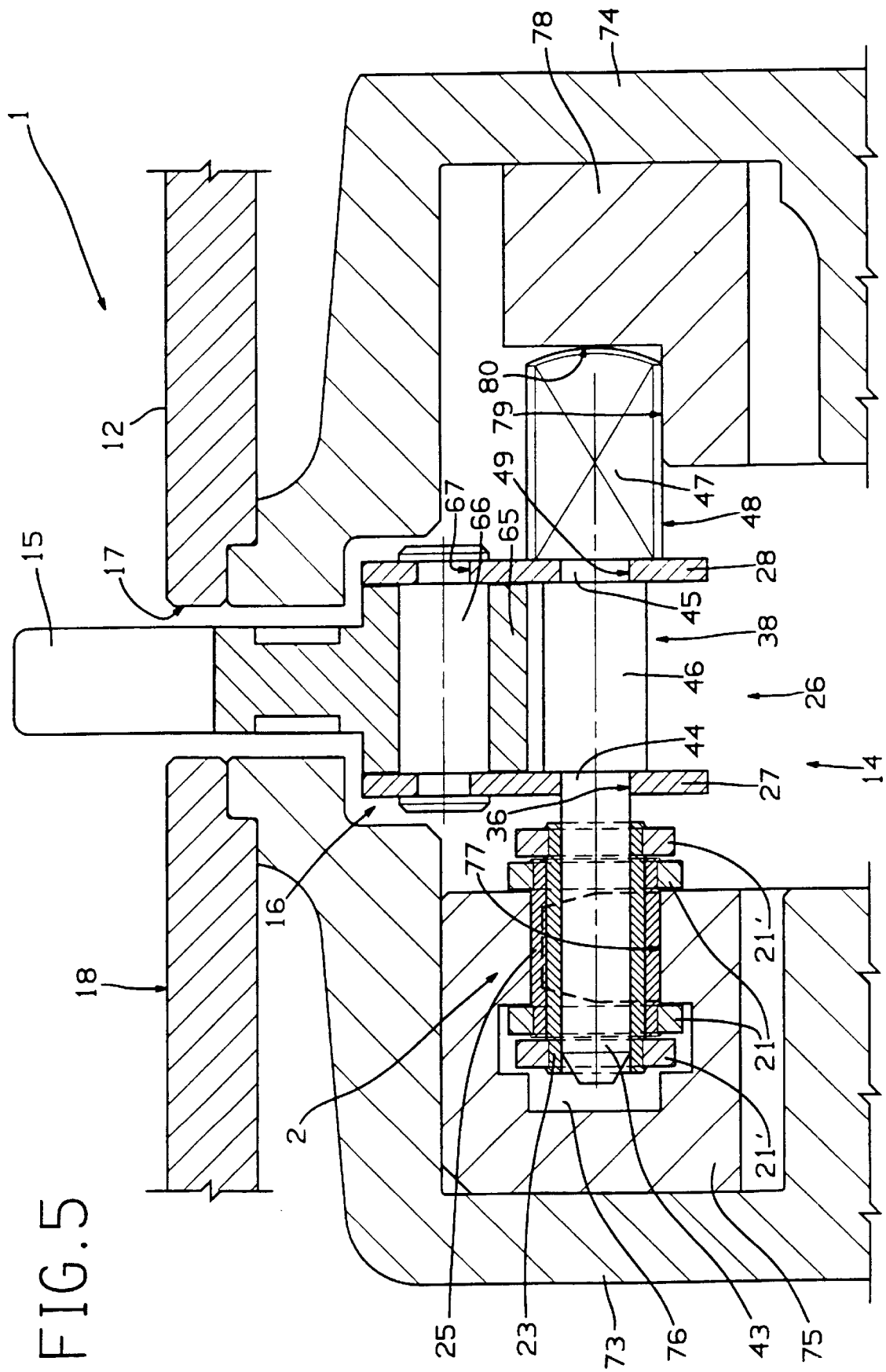
FIG. 5 shows a section along line V—V in FIG. 2.

FIG. 5 shows two supporting elements 73 and 74 located on opposite sides of conveying branch 8. Element 73 provides for strengthening table 12 at opening 17, and supports a guide 75 extending in direction 7 and parallel to conveying branch 8. Guide 75 has a longitudinal groove 76 along which chain 2 runs, and which is defined at the bottom by a flat surface 77 on which run spacers 25 of chain 2.

Similarly, element 74 provides for strengthening table 12 at opening 17, and supports a guide 78 extending in direction 7 along conveying branch 8. Guide 78 has a substantially L-shaped section defined by a surface 79 and a surface 80 respectively parallel and perpendicular to surface 18, and which respectively define a supporting and sliding surface and an end stop surface for heads 42 and 47.

In push member 14 described above, pin 38 is therefore located ahead of pin 37 in direction 7; pin 60 is interposed between pins 37 and 38, and between pins 51 and 38; and pin 51 is interposed between pins 37 and 38.

Control device 16 therefore also comprises an articulated quadrilateral 81 in turn comprising a movable frame defined by lever 26, two cranks defined by levers 50 and 65, and a connecting rod defined by lever 68.

In actual use, chain 2 is driven by drive pulley 4 to move each push member 14 of conveying branch 8 in direction 7. Each push appendix 15, positioned perpendicular to surface 18 of table 12, is brought into contact with a product 13 fed onto conveyor 1 by a known supply device not shown, and feeds product 13 along table 12.

When chain 2 is straight, as along conveying branch 8, pins 37, 38, 60 are coplanar by ends 39, 43, 61 being inserted inside hollow pins 23 connecting elements 20 and 22 of chain 2, and control device 16 assumes a first stable configuration "A" and undergoes no change in form until pin 38 passes point R. Conversely, when pin 38 passes point R, control device 16 is deformed gradually to assume a second stable configuration "B" upon pin 37 reaching point R. In particular, when a push member 14 is fed along branch 11, lever 26 is positioned along the line joining pins 37 and 38, i.e. along a secant of branch 11. As the distance between pins 37 and 38 of a control device 16 in configuration "B" is less than the distance between the same pins 37 and 38 of the same device 16 in configuration "A", the passage of device 16 from configuration "A" to configuration "B", which occurs gradually between the instant in which respective pin 38 passes point R and the instant in which respective pin 37 reaches point R, causes respective lever 26 to rotate about pin 38 and to translate with respect to pin 37, which in turn rotates with respect to chain 2.

When at least one of the two pins 37, 38 is located along a curved branch 10 or 11, pin 60 is no longer coplanar with pins 37, 38, so that lever 50 is rotated, with respect to lever 26, about pin 51 in the opposite direction to the rotation direction of pulley 3 or 4.

In other words, as each control device 16 engages branch 11 or 10, lever 26 rotates about axis 6 or 5 and assumes an infinite succession of positions with respect to direction 7. Lever 50, on the other hand, rotates in the opposite direction to the rotation direction of pulley 4 or 3 to compensate for the change in the angle of appendix 15 with respect to the supporting surface 18 of table 12.

As lever 50 is hinged to lever 65 by connecting rod 68, and lever 65 is connected to lever 26, lever 65 also rotates in the opposite direction to the rotation direction of pulley 4 or 3.

Device 16 passes gradually from configuration "A" to configuration "B", in that pin 38 begins traveling along the path defined by branch 11, while pin 37 continues traveling along the path defined by branch 8, and pin 60 gradually increases the distance from the plane containing pins 37 and 38.

The resulting displacement of push appendix 15 is proportional to the mean curvature of the portion of path P1 between pins 37 and 38, and is such as to keep appendix 15 parallel to itself and compensate for the rotation of lever 26 along branch 11.

When both pins 37 and 38 lie along branch 11, the position of pin 60 remains unchanged with respect to pins 37 and 38, thus preventing any correction to the position of appendix 15, which begins rotating integrally with lever 26 about axis 6.

The portion of branch 11 along which the position of appendix 15 is corrected may be varied by varying the lengths of levers 26, 50, 65, 68 and the points at which levers 26, 50, 65, 68 are secured to chain 2 and to one another.

Chain 2 may, of course, be replaced by any other flexible conveying member without, however, departing from the scope of the present invention.

I claim:

1. A conveyor for feeding push members (14) along a path (P1) comprising at least one curved portion and at least one straight portion (10, 11); the conveyor (1) comprising a flexible conveying member (2), and at least one said push member (14) connected to the flexible conveying member (2) to move, together with the flexible conveying member (2), along said path (P1) in a given traveling direction (7); the push member (14) comprising a push appendix (15), and a control device (16) interposed between the push appendix (15) and the flexible conveying member (2) to keep the orientation of the push appendix (15) relative to the straight portion of the path (P1) the same as the push member (14) travels along at least part of said curved portion (10, 11) of the path (P1); and the control device (16) comprising a first lever (26) supporting the push appendix (15) and having two opposite ends connected, one in rotary and axially-sliding manner and the other only in rotary manner, to the flexible conveying member (2), so as to rotate, with respect to the flexible conveying member (2), about a first and a second axis (37, 38) parallel to each other and perpendicular to said path (P1); characterized in that the push appendix (15) is mounted for rotation with respect to the first lever (26), so as to rotate, with respect to the first lever (26), about a third axis (66) parallel to said first and second axes (37, 38); and the control device (16) comprises a second lever (50), which is mounted for rotation with respect to the first lever (26), is connected in articulated manner to the push appendix (15), and is inclined, with respect to the first lever (26), at an angle which varies as the push member (14) moves from the straight portion of the path (P1) to the curved portion of the path (P1).

2. A conveyor as claimed in claim 1, characterized in that said second lever (50) is connected to the first lever (26) so as to rotate, with respect to the first lever (26), about a fourth axis (51) parallel to the first axis (37), and is connected to the flexible conveying member (2) to rotate, with respect to the flexible conveying member (2), about a fifth axis (60) parallel to the fourth axis (51) and located a given distance from the fourth axis (51).

3. A conveyor as claimed in claim 2, characterized in that said second axis (38) is located ahead of the first axis (37) in said traveling direction (7), and adjacent to the third axis (66).

4. A conveyor as claimed in claim 3, characterized in that said fifth axis (60) is interposed between the first and the second axis (37; 38).

5. A conveyor as claimed in claim 3, characterized in that said fifth axis (60) is interposed between the fourth and the second axis (51; 38).

6. A conveyor as claimed in claim 3, characterized in that said fourth axis (51) is interposed between the first and the second axis (37; 38).

7. A conveyor as claimed in claim 6, characterized by also comprising a table (12) having an opening (17) extending perpendicular to said first axis (37); said path (P1) being locate beneath said table (12); and the push appendix (15) engaging said opening (17) in transversely-sliding manner.

8. A conveyor as claimed in claim 1, characterized in that the control device (16) comprises a third lever (65) hinged to the first lever (26) to rotate, with respect to the first lever (26), about the third axis (66); said push appendix (15) defining an end portion of the third lever (65).

9. A conveyor as claimed in claim 8, characterized in that said control device also comprises a fourth lever (68) connecting the second and the third lever (50; 65) in articulated manner.

10. A conveyor as claimed in claim 9, characterized in that said control device (16) comprises an articulated quadrilateral (81) in turn comprising a movable frame defined by said first lever (26), two cranks defined respectively by said second lever (50) and said third lever (65), and a connecting rod defined by said fourth lever (68).

11. A conveyor as claimed in claim 1, characterized in that the flexible conveying member (2) comprises a chain (2) defined by a succession of links (19) articulated to rotate with respect to one another about axes (23) parallel to said first axis; the first lever (26) extending along the chain (2) by a length at least equal to two said links (19).

12. A conveyor as claimed in claim 1, characterized in that the first lever (26) comprises a pair of facing parallel plates (27, 28) having identical outer profiles and maintained a given distance apart by a spacer (30).

13. A conveyor as claimed in claim 11, characterized in that a first end (33) of each plate (27, 28) has a slot (34) for housing a first pin (37) coaxial with the first axis; and a second end (35) of one of said plates (27, 28) has a hole (36) for housing a second pin (38) coaxial with the second axis (38).

* * * * *